United States Patent
Kawanabe et al.

(10) Patent No.: US 8,576,267 B2
(45) Date of Patent: Nov. 5, 2013

(54) OPTICAL WRITING DEVICE, IMAGE FORMING APPARATUS, OPTICAL WRITING METHOD, AND COMPUTER-READABLE RECORDING MEDIUM

(75) Inventors: Motohiro Kawanabe, Hyogo (JP); Tatsuya Miyadera, Osaka (JP); Masayuki Hayashi, Osaka (JP); Kunihiro Komai, Osaka (JP); Yasuo Yamaguchi, Osaka (JP); Yoshinori Shirasaki, Osaka (JP); Takeshi Shikama, Osaka (JP); Izumi Kinoshita, Hyogo (JP); Susumu Miyazaki, Osaka (JP); Takuhei Yokoyama, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/474,062

(22) Filed: May 17, 2012

(65) Prior Publication Data
US 2012/0300010 A1 Nov. 29, 2012

(30) Foreign Application Priority Data
May 24, 2011 (JP) ................. 2011-116043

(51) Int. Cl.
*B41J 2/47* (2006.01)
*G06K 15/00* (2006.01)
*H04N 1/405* (2006.01)

(52) U.S. Cl.
USPC ........................... 347/240; 347/251; 358/3.13

(58) Field of Classification Search
USPC .......... 347/232, 240, 251–254; 358/3.06, 3.1, 358/3.13–3.19
See application file for complete search history.

(56) References Cited

U.S. PATENT DOCUMENTS

| | | | | |
|---|---|---|---|---|
| 5,140,349 A | * | 8/1992 | Abe et al. | 347/129 |
| 2010/0060938 A1 | * | 3/2010 | Kondoh | 358/3.13 |

FOREIGN PATENT DOCUMENTS

| | | |
|---|---|---|
| JP | 2001-298616 | 10/2001 |
| JP | 2002-185787 | 6/2002 |
| JP | 2003-125202 | 4/2003 |
| JP | 2004-336161 | 11/2004 |
| JP | 4096802 | 3/2008 |
| JP | 4097114 | 3/2008 |
| JP | 2010-141608 | 6/2010 |

* cited by examiner

*Primary Examiner* — Hai C Pham
(74) *Attorney, Agent, or Firm* — Oblon, Spivak, McClelland, Maier & Neustadt, L.L.P.

(57) ABSTRACT

An optical writing device stores pieces of dithering information indicating dithering patterns whose densities are different, each piece of dithering information including pieces of identification information associated with pixels of the corresponding dithering pattern, and stores pieces of pixel setting information in which pieces of colored/colorless information indicating each of the pixels is colored or colorless are associated with the pieces of identification information, the pieces of colored/colorless information being set based on a resolution of a light source for forming an electrostatic latent image. The optical writing device also includes a control unit configured to arrange the same dithering patterns in a way that the dithering patterns form a pattern with a given size, and cause the light source to emit light based on information generated by setting the pixels of each of the same dithering patterns to be colored or colorless in accordance with the pixel setting information.

6 Claims, 7 Drawing Sheets

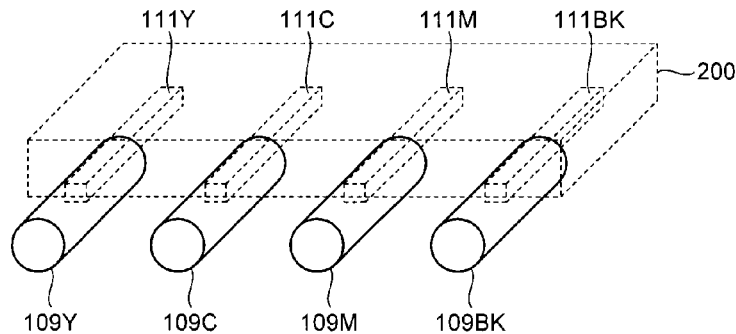
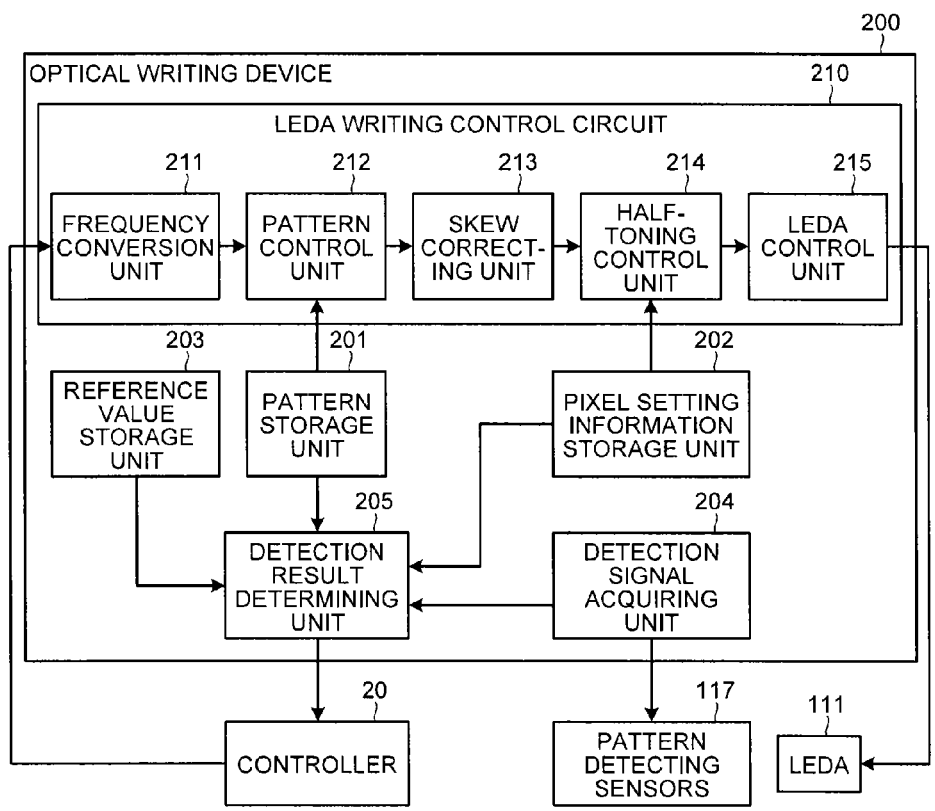

FIG.6A

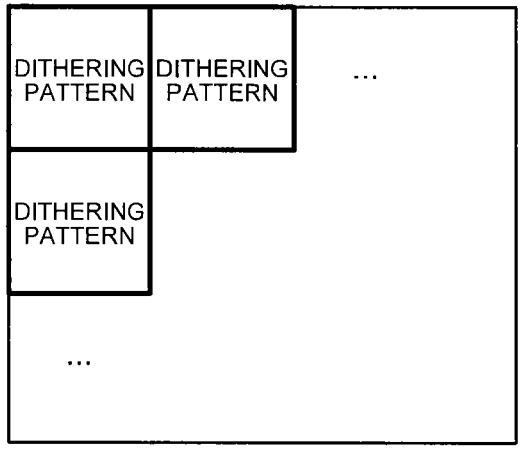

FIG.6B

| psdat00 [3:0] | psdat01 [3:0] | psdat02 [3:0] | psdat03 [3:0] | psdat04 [3:0] | psdat05 [3:0] | psdat06 [3:0] | psdat07 [3:0] |
|---|---|---|---|---|---|---|---|
| psdat10 [3:0] | psdat11 [3:0] | psdat12 [3:0] | psdat13 [3:0] | psdat14 [3:0] | psdat15 [3:0] | psdat16 [3:0] | psdat17 [3:0] |
| psdat20 [3:0] | psdat21 [3:0] | psdat22 [3:0] | psdat23 [3:0] | psdat24 [3:0] | psdat25 [3:0] | psdat26 [3:0] | psdat27 [3:0] |
| psdat30 [3:0] | psdat31 [3:0] | psdat32 [3:0] | psdat33 [3:0] | psdat34 [3:0] | psdat35 [3:0] | psdat36 [3:0] | psdat37 [3:0] |
| psdat40 [3:0] | psdat41 [3:0] | psdat42 [3:0] | psdat43 [3:0] | psdat44 [3:0] | psdat45 [3:0] | psdat46 [3:0] | psdat47 [3:0] |
| psdat50 [3:0] | psdat51 [3:0] | psdat52 [3:0] | psdat53 [3:0] | psdat54 [3:0] | psdat55 [3:0] | psdat56 [3:0] | psdat57 [3:0] |
| psdat60 [3:0] | psdat61 [3:0] | psdat62 [3:0] | psdat63 [3:0] | psdat64 [3:0] | psdat65 [3:0] | psdat66 [3:0] | psdat67 [3:0] |
| psdat70 [3:0] | psdat71 [3:0] | psdat72 [3:0] | psdat73 [3:0] | psdat74 [3:0] | psdat75 [3:0] | psdat76 [3:0] | psdat77 [3:0] |

FIG.7

| LIGHT EMISSION ID | PERFORMANCE OF PRINTING ENGINE | | | |
|---|---|---|---|---|
| | 600 × 600 dpi | 1200 × 1200 dpi | 1200 × 2400 dpi | 2400 × 2400 dpi |
| 0 | | | | |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| A | | | | |
| B | | | | |
| C | | | | |
| D | | | | |
| E | | | | |
| F | | | | |

OPTICAL WRITING DEVICE, IMAGE FORMING APPARATUS, OPTICAL WRITING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2011-116043 filed in Japan on May 24, 2011.

BACKGROUND OF THE INVENTION

1. Field of the Invention

The present invention relates to an optical writing device, an image forming apparatus, an optical writing method, and a computer-readable recording medium.

2. Description of the Related Art

Recently, electronization of information has been encouraged, and image processing apparatuses such as printers or facsimiles used for outputting electronic information and scanners used for electronizing documents play essential roles accordingly. Such image processing apparatuses are often configured as multifunction peripherals (MFP) that can be used as a printer, a facsimile, a scanner, and a copying machine, by being provided with an image capturing function, an image forming function, and a communication function, for example.

Among such image processing apparatuses, electrophotographic image forming apparatuses are widely used as image forming apparatuses for outputting electronic documents. An electrophotographic image forming apparatus outputs an electronic document to a paper sheet by exposing the photosensitive element to form an electrostatic latent image, developing the electrostatic latent image into a toner image with a developer such as toner, and transferring the toner image onto the sheet.

As the apparatus ages, a density variation occurs in the toner image formed by development because of various causes. Possible causes include a variation in the conditions in which the photosensitive element is exposed because of wearing of the photosensitive element or deterioration in the light source, and in the conditions in which the photosensitive element is charged because of deterioration in the photosensitive element.

As methods for correcting the density variation caused by aging of the apparatus, besides adjustments of the exposure conditions or the charging conditions, image processing is also possible. This method for correcting density through image processing is called dithering. Dithering is a method that enables image density to be changed without causing any negative impact on the image, by "thinning out" some pixels dispersed across an image to be output, and replacing these pixels with pixels without any color.

Known as a method for realizing a density variation correction through density adjustment with dithering is outputting a plurality of dithering patterns each having a different density at a given interval, reading the patterns to obtain density, and selecting a dithering pattern to be applied to perform density adjustment on the basis of the obtained density. For example, Japanese Patent Application Laid-open No. 2004-336161 describes a method including preparing two different tone scales to be used for dithering and associated with each other, generating a pattern using a dither with a smaller number of tone levels, and reflecting correction information received from a sensor to a dither with a larger number of tone levels in accordance with the association.

Generally, in an image forming apparatus, an image processing unit that generates raster image processor (RIP) data, that is, pixel data of the image to be output, and an engine unit that actually makes an image formation output based on the pixel data are structured as separate units. Therefore, the image processing unit and the engine unit are designed separately. Therefore, interoperability needs to be considered upon designing the image processing unit and the engine unit.

In a method in which the exposure conditions or the charging conditions are adjusted, because the method can be performed within the engine unit, the interoperability with an image processing unit does not need to be considered. By contrast, in the above-described method involving dithering, it is the image processing unit that typically applies dithering to an image, and thus the interoperability between the engine unit and the image processing unit needs to be considered.

To adjust density using dithering, a plurality of dither patterns each having a different density are output as mentioned earlier. Therefore, the resolution of the dithering patterns needs to be matched to the resolution of the engine unit. Hence, to design an image processing unit that is interoperable with different types of engine units, dithering patterns in different resolutions are required. This results in an increase in a required memory capacity in the image processing unit. Furthermore, even if dithering patterns in different resolutions are prepared, only used is the dithering pattern supporting the resolution of the engine unit connected to the image processing unit, and most of the memory capacity is wasted.

Furthermore, when the method disclosed in Japanese Patent Application Laid-open No. 2004-336161 is used, the memory capacity can be reduced by establishing an association between the dither with a smaller number of tone levels and the dither with a larger number of tone levels. However, because the pattern is formed using the dither with a smaller number of tone levels, the resolution of the correction is limited. Accordingly, highly precise correction cannot be provided.

Therefore, there is a need for an optical writing device capable of enabling highly precise density correction through dithering without increasing the complexity of structures of an image processing unit and an engine unit included in an image forming apparatus.

SUMMARY OF THE INVENTION

It is an object of the present invention to at least partially solve the problems in the conventional technology.

According to an embodiment, there is provided an optical writing device that includes a pattern storage unit configured to store therein pieces of dithering information indicating a plurality of dithering patterns whose densities are different, each dithering pattern being made up of a given number of pixels, each piece of dithering information including pieces of identification information associated with the pixels of the corresponding dithering pattern, respectively; a pixel setting information storage unit configured to store therein pieces of pixel setting information in which pieces of colored/colorless information indicating each of the pixels is colored or colorless are associated with the pieces of identification information, respectively, the pieces of colored/colorless information being set based on a resolution of a light source for forming an electrostatic latent image on a photosensitive element; a light emission control unit configured to causes the light source to emit light based on pixel information; a reading signal acquiring unit configured to acquire a reading signal resulting from optically reading an image formed by developing the electrostatic latent image formed on the photosensitive element and conveyed; and a dithering pattern selecting unit configured to select and output one of the pieces of dithering information based on the reading signal. In an operation of selecting the dithering pattern, the light emission control unit arranges the same dithering patterns in a way that the dithering patterns form a pattern with a given size, for each of the different dithering patterns stored, and cause the light source to emit light based on pixel information generated by setting the pixels of each of the same dithering patterns to be colored or colorless in accordance with the pixel setting information, to form electrostatic latent images of a plurality of patterns each in the given size and in a different density. The reading signal acquiring unit acquires a reading signal corresponding to the density for each of the patterns in the given size and different densities. The dithering pattern selecting unit selects and outputs one of the pieces of dithering information corresponding to a reading signal that indicates a density closest to a predetermined reference density among the reading signals acquired from the patterns in the given size and the different densities.

According to another embodiment, there is provided an image forming apparatus that includes an image processing unit configured to perform image processing based on a print job; and the optical writing device according to the above embodiment. The image processing unit performs image processing using the one of the pieces of dithering information output from the optical writing device.

According to still another embodiment, there is provided an optical writing method performed in an optical writing device that includes a pattern storage unit configured to store therein pieces of dithering information indicating a plurality of dithering patterns whose densities are different, each dithering pattern being made up of a given number of pixels, each piece of dithering information including pieces of identification information associated with the pixels of the corresponding dithering pattern, respectively, and a pixel setting information storage unit configured to store therein pieces of pixel setting information in which pieces of colored/colorless information indicating each of the pixels is colored or colorless are associated with the pieces of identification information, respectively, the pieces of colored/colorless information being set based on a resolution of a light source for forming an electrostatic latent image on a photosensitive element. The optical writing method includes arranging the same dithering patterns in a way that the dithering patterns form a pattern with a given size, for each of the different dithering patterns stored; causing the light source to emit light based on pixel information generated by setting the pixels of each of the same dithering patterns to be colored or colorless in accordance with the pixel setting information, to form electrostatic latent images of a plurality of patterns each in the given size and in a different density; acquiring a reading signal corresponding to the density for each of the patterns in the given size and different densities; and selecting and outputting one of the pieces of dithering information corresponding to a reading signal that indicates a density closest to a predetermined reference density among the reading signals acquired from the patterns in the given size and the different densities.

According to still another embodiment, there is provided a non-transitory computer-readable recording medium with an executable program stored thereon for controlling an optical writing device that includes a pattern storage unit configured to store therein pieces of dithering information indicating a plurality of dithering patterns whose densities are different, each dithering pattern being made up of a given number of pixels, each piece of dithering information including pieces of identification information associated with the pixels of the corresponding dithering pattern, respectively, and a pixel setting information storage unit configured to store therein pieces of pixel setting information in which pieces of colored/colorless information indicating each of the pixels is colored or colorless are associated with the pieces of identification information, respectively, the pieces of colored/colorless information being set based on a resolution of a light source for forming an electrostatic latent image on a photosensitive element. The program instructs a processor of the optical writing device to perform arranging the same dithering patterns in a way that the dithering patterns form a pattern with a given size, for each of the different dithering patterns stored; causing the light source to emit light based on pixel information generated by setting the pixels of each of the same dithering patterns to be colored or colorless in accordance with the pixel setting information, to form electrostatic latent images of a plurality of patterns each in the given size and in a different density; acquiring a reading signal corresponding to the density for each of the patterns in the given size and different densities; and selecting and outputting one of the pieces of dithering information corresponding to a reading signal that indicates a density closest to a predetermined reference density among the reading signals acquired from the patterns in the given size and the different densities.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic of a general structure of an optical writing device according to the embodiment;

FIG. 5 is a block diagram illustrating a functional configuration of the optical writing device according to the embodiment;

FIGS. 6A and 6B are schematics of configurations of a correction pattern according to the embodiment;

FIG. 7 is a schematic of information of pixels used in a dithering pattern according to the embodiment;

DETAILED DESCRIPTION OF THE PREFERRED EMBODIMENTS

An embodiment of the present invention will now be explained in detail with reference to some drawings. In the embodiment, an image forming apparatus is explained to be a multifunctional peripheral (MFP), as an example. However, the image forming apparatus is not necessarily an MFP, and may be a copying machine, a printer, a facsimile, and the like.

Figure 1:
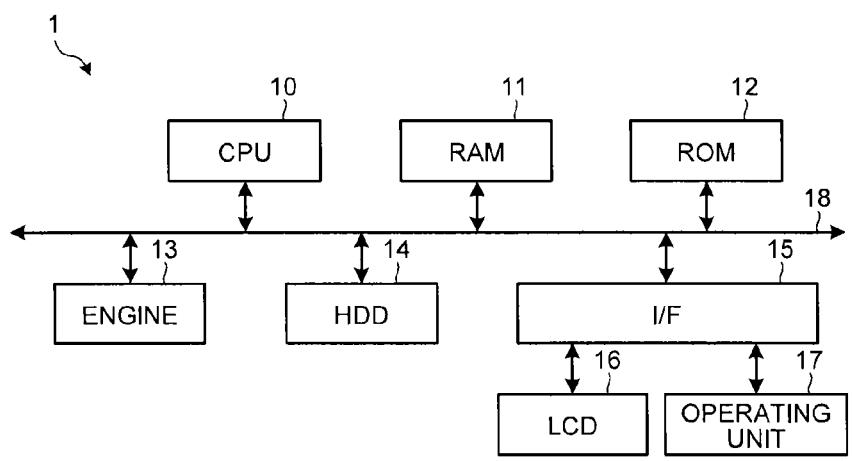
FIG. 1 is a block diagram illustrating a hardware configuration of an image forming apparatus according to an embodiment of the present invention.

FIG. 1 is a block diagram illustrating a hardware configuration of an image forming apparatus 1 according to the embodiment. As illustrated in FIG. 1, the image forming apparatus 1 according to the embodiment includes an engine that performs image formation, in addition to structures of a general information processing terminal such as a server or a personal computer (PC). In other words, in the image forming apparatus 1 according to the embodiment, a central processing unit (CPU) 10, a random access memory (RAM) 11, a read-only memory (ROM) 12, an engine 13, a hard disk drive (HDD) 14, and an interface (I/F) 15 are connected to each other via a bus 18. A liquid crystal display (LCD) 16 and an operating unit 17 are connected to the I/F 15.

The CPU 10 is a computing unit, and controls operations of the entire image forming apparatus 1. The RAM 11 is a volatile storage medium from or to which information can be read or written at a high speed, and is used as a working area when the CPU 10 processes information. The ROM 12 is a read-only, nonvolatile storage medium, and stores therein computer programs such as firmware. The engine 13 is a mechanism that actually performs image formation in the image forming apparatus 1.

The HDD 14 is a nonvolatile storage medium from or to which information can be read or written, and stores therein an operating system (OS), various control programs, application programs, and the like. The I/F 15 connects and controls the bus 18 and various hardware, a network, and the like. The LCD 16 is a visual user interface for allowing a user to check the status of the image forming apparatus 1. The operating unit 17 is a user interface, such as a keyboard and a mouse, for allowing a user to input information to the image forming apparatus 1.

In such a hardware configuration, a computer programs stored in a recording medium such as the ROM 12, the HDD 14, and an optical disk not illustrated are read onto the RAM 11, and the CPU 10 performs operations following the computer programs, to realize a software controller. A combination of the software controller thus realized and the hardware realizes functional blocks for enabling functions of the image forming apparatus 1 according to the embodiment.

Figure 2:
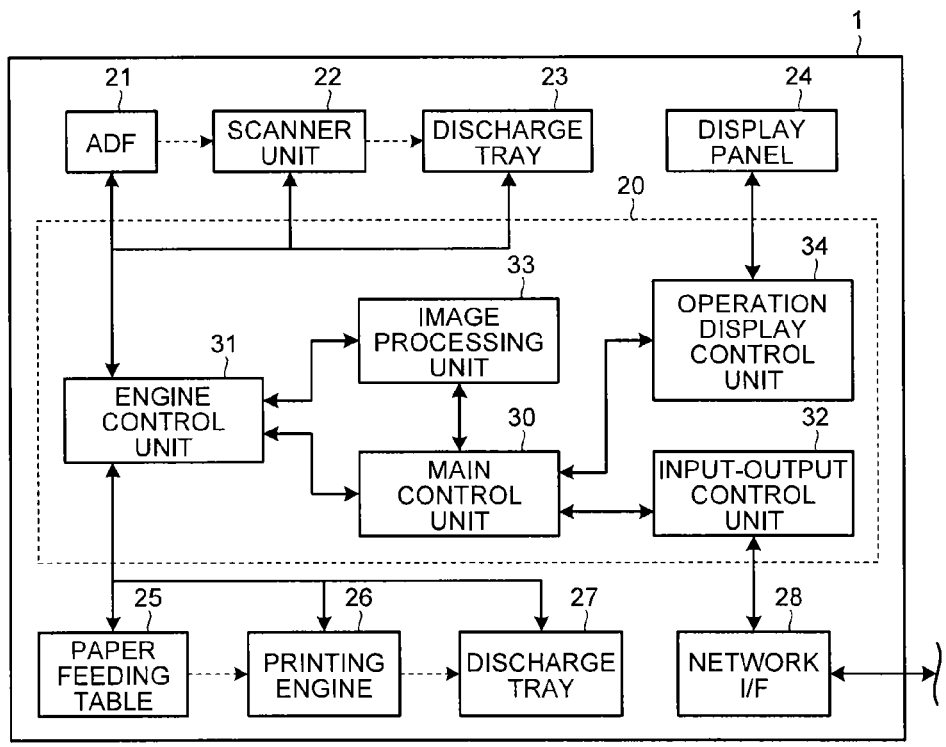
FIG. 2 is a block diagram illustrating a functional configuration of the image forming apparatus according to the embodiment.

A functional configuration of the image forming apparatus 1 according to the embodiment will now be explained with reference to FIG. 2. FIG. 2 is a block diagram illustrating a functional configuration of the image forming apparatus 1 according to the embodiment. As illustrated in FIG. 2, the image forming apparatus 1 according to the embodiment includes a controller 20, an automatic document feeder (ADF) 21, a scanner unit 22, a discharge tray 23, a display panel 24, a paper feeding table 25, a printing engine 26, a discharge tray 27, and a network I/F 28.

The controller 20 includes a main control unit 30, an engine control unit 31, an input-output control unit 32, an image processing unit 33, and an operation display control unit 34. As illustrated in FIG. 2, the image forming apparatus 1 according to the embodiment is configured as an MFP having the scanner unit 22 and the printing engine 26. In FIG. 2, electrical connections are indicated by arrows in a solid line, and movement of a paper sheet is indicated by arrows in a dotted line.

The display panel 24 functions as an output interface that visually displays a status of the image forming apparatus 1, and also as an input interface (operating unit) that is a touch panel for allowing a user to operate the image forming apparatus 1 directly or to input information to the image forming apparatus 1. The network I/F 28 is an interface for allowing the image forming apparatus 1 to communicate with other apparatuses over a network, and an Ethernet (registered trademark) interface or an universal serial bus (USB) interface is used.

The controller 20 is realized as a combination of software and hardware. Specifically, the controller 20 includes a software controller that is realized by loading control programs such as firmware stored in the ROM 12, a nonvolatile memory, a nonvolatile recording medium, e.g., the HDD 14, or the optical disk, onto a volatile memory (hereinafter, referred to as a memory) such as the RAM 11 under the control of the CPU 10, and hardware such as an integrated circuit. The controller 20 functions as a control unit that controls the entire image forming apparatus 1.

The main control unit 30 plays a role in controlling each of the units included in the controller 20, and gives instructions to each of the units included in the controller 20. The engine control unit 31 plays a role of driving means for controlling or driving the printing engine 26, the scanner unit 22, and the like. The input-output control unit 32 inputs signals and instructions received via the network I/F 28 to the main control unit 30. The main control unit 30 controls the input-output control unit 32, and accesses other apparatuses via the network I/F 28.

The image processing unit 33 generates drawing information based on print information included in a received print job, under the control of the main control unit 30. The drawing information is information for allowing the printing engine 26 that is an image forming unit to draw an image through an image forming operation, and is pixel information being information of pixels making up the image to be output. The print information included in a print job is image information converted by a printer driver installed in an information processing apparatus such as a PC into a format that can be recognized by the image forming apparatus 1.

To generate the drawing information, the image processing unit 33 applies a specified dithering pattern to the image information to be printed. In other words, the image processing unit 33 adjusts the density by "thinning out" some pixels dispersed across the image from the image information to be printed using the specified dithering pattern. An operation of re-selecting the dithering pattern corresponding to aging of the apparatus is an essential feature according to the embodiment. The operation display control unit 34 displays information onto the display panel 24, or notifies information input via the display panel 24 to the main control unit 30.

When the image forming apparatus 1 operates as a printer, the input-output control unit 32 receives a print job via the network I/F 28 as a trigger. The input-output control unit 32 forwards the print job thus received to the main control unit 30. Upon receiving the print job, the main control unit 30 controls the image processing unit 33 to generate drawing information based on the print information included in the print job.

Once the drawing information is generated by the image processing unit 33, the engine control unit 31 performs image formation onto a paper sheet conveyed from the paper feeding table 25, based on the drawing information generated by the image processing unit 33. In other words, the printing engine 26 functions as an image forming unit. The paper sheet on which an image is formed by the printing engine 26 is discharged onto the discharge tray 27.

When the image forming apparatus 1 operates as a scanner, in response to a user operation made on the display panel 24 or a reading execution instruction received from an external PC and the like via the network I/F 28, the operation display control unit 34 or the input-output control unit 32 forwards the reading execution signal to the main control unit 30. The main control unit 30 controls the engine control unit 31 based on the reading execution signal thus received.

The engine control unit 31 drives the ADF 21 to convey a document having an image to be captured and placed on the ADF 21 to the scanner unit 22. The engine control unit 31 also drives the scanner unit 22 to capture the image of the document conveyed by the ADF 21. When the document is not set on the ADF 21 but is directly placed on the scanner unit 22, the scanner unit 22 captures the image of the document thus placed, under the control of the engine control unit 31. In other words, the scanner unit 22 operates as an image capturing unit.

In an image capturing operation, an image capturing element, such as a charge coupled device (CCD) included in the scanner unit 22 optically reads the document, and information of the captured image is generated based on the optical information. The engine control unit 31 transmits the captured image information generated by the scanner unit 22 to the image processing unit 33. The image processing unit 33 generates image information based on the captured image information received from the engine control unit 31, under the control of the main control unit 30. The image information generated by the image processing unit 33 is stored in a storage medium such as the HDD 14 mounted on the image forming apparatus 1. In other words, the scanner unit 22, the engine control unit 31, and the image processing unit 33 function as a document reading unit by cooperating with each other.

The image information generated by the image processing unit 33 is stored in the HDD 14 and the like as it is, or transmitted to an external apparatus via the input-output control unit 32 and the network I/F 28 based on a user instruction. In other words, the ADF 21 and the engine control unit 31 function as an image input unit.

When the image forming apparatus 1 operates as a copying machine, the image processing unit 33 generates drawing information based on the captured image information received by the engine control unit 31 from the scanner unit 22 or the image information generated by the image processing unit 33. Based on the drawing information, the engine control unit 31 drives the printing engine 26 in the same manner as in a printer operation.

Figure 3:
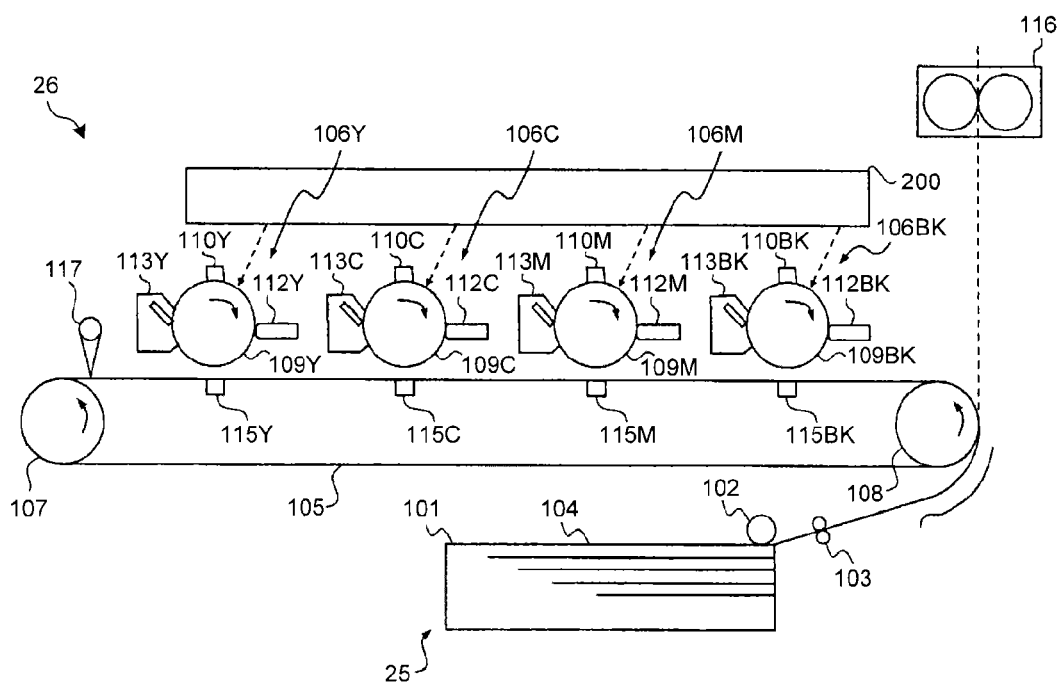
FIG. 3 is a schematic of a structure of a printing engine according to the embodiment.

A structure of the printing engine 26 according to the embodiment will now be explained with reference to FIG. 3. As illustrated in FIG. 3, the printing engine 26 according to the embodiment has a so-called tandem structure including image forming units 106 in respective colors arranged along a carriage belt 105 that is a moving unit. In other words, a plurality of image forming units (electrophotographic processing units) 106BK, 106M, 106C, 106Y are arranged along the carriage belt 105 sequentially from the upstream side in the conveying direction of the carriage belt 105 that is an intermediate transfer belt where an intermediate transfer image is transferred onto a paper sheet (an example of a recording medium) 104 that is fed by a paper feeding roller 102 from a paper feed tray 101 and separated by separating rollers 103.

The internal structures of the image forming units 106BK, 106M, 106O, 106Y are the same, except that the color of the toner image formed by each of the image forming units 106BK, 106M, 106C, 106Y is different. The image forming unit 106BK forms a black image, the image forming unit 106M forms a magenta image, the image forming unit 106C forms a cyan image, and the image forming unit 106Y forms a yellow image. In the explanation below, the image forming unit 106BK will be explained specifically, and, because the other image forming units 106M, 106C, 106Y are the same as the image forming unit 106BK, elements included in the respective image forming units 106M, 106C, 106Y are assigned with discriminating signs M, C, Y, instead of BK appended to the image forming unit 106BK, and are illustrated in drawings only, and explanations thereof are omitted hereunder.

The carriage belt 105 is an endless belt stretched across a driving roller 107 that is driven in rotation, and a driven roller 108. The driving roller 107 is driven in rotation by a driving motor not illustrated. The driving motor, the driving roller 107, and the driven roller 108 function as a driving unit for moving the carriage belt 105 that is the moving unit.

When an image is to be formed, the first image forming unit 106BK transfers a black toner image onto the carriage belt 105 that is driven in rotation. The image forming unit 106BK includes a photosensitive drum 109BK as a photosensitive element, and a charging device 110BK, an optical writing device 200, a developing device 112BK, a photosensitive element cleaning device (not illustrated), and a neutralization device 113BK each of which are arranged around the photosensitive drum 109BK. The optical writing device 200 is configured to irradiate each of the photosensitive drums 109BK, 109M, 109C, 109Y (hereinafter, any one of the photosensitive drums is referred to as the "photosensitive drum 109") with light.

When an image is to be formed, after the outer circumferential surface of the photosensitive drum 109BK is uniformly charged by the charging device 110BK in the darkness, writing is performed to the outer circumferential surface by light output from a light source corresponding to a black image and included in the optical writing device 200, and an electrostatic latent image is thus formed. The developing device 112BK then visualizes the electrostatic latent image with black toner. In this manner, a black toner image is formed on the photosensitive drum 109BK.

The toner image is transferred onto the carriage belt 105 by an operation of a transfer unit 115BK at a position (transfer position) where the photosensitive drum 109BK and the carriage belt 105 abut against each other or are nearest each other. By this transfer, a black toner image is formed on the carriage belt 105. On the photosensitive drum 109BK from which the toner image is transferred, the waste toner remaining on the outer circumferential surface is wiped by the photosensitive element cleaning device, and neutralized by the neutralization device 113BK, and kept stand by for the next image formation.

By driving rollers of the carriage belt 105, the black toner image transferred onto the carriage belt 105 in the image forming unit 106BK, in the manner described above, is conveyed to the next image forming unit 106M. In the image forming unit 106M, a magenta toner image is formed on the photosensitive drum 109M through the same image forming process as that performed in the image forming unit 106BK, and the toner image is transferred onto the black image that is already formed, in a manner superimposed over the black image.

The black and the magenta toner images transferred onto the carriage belt 105 are further conveyed into the next image forming units 106C, 106Y, and a cyan toner image formed on the photosensitive drum 109C and a yellow toner image formed on the photosensitive drum 109Y are transferred onto the images that are already transferred in a superimposed manner, through the same operations. In this manner, a full-color intermediate transfer image is formed on the carriage belt 105.

The paper sheet 104 stored in the paper feed tray 101 is sequentially fed from the sheet at the top, and the intermediate transfer image formed on the carriage belt 105 is transferred onto the surface of the paper sheet at a position where the conveying channel comes into contact with or nearest to the carriage belt 105. In this manner, an image is formed on the surface of the paper sheet 104. The paper sheet 104 having the image thus formed on the surface is further conveyed. After the image is fixed in a fixing unit 116, the paper sheet 104 is discharged from the image forming apparatus.

In such an image forming apparatus 1, due to an error in the distance between axes of the photosensitive drums 109BK, 109M, 109C, 109Y, an error in parallelism between the photosensitive drums 109BK, 109M, 109C, 109Y, an installation error of the light sources in the optical writing device 200, an operational timing error at which the electrostatic latent images are written to the photosensitive drums 109BK, 109M, 109C, 109Y, the toner images in the respective colors might not be superimposed over one another at positions where such toner images should be superimposed over one another, and a positional deviation between the colors might occur.

In addition, due to the same causes, in a paper sheet on which the image is transferred, the image could be transferred onto an area outside of an area where the image should be transferred. Known as main components of such a positional deviation are a skew, a registration error in the sub-scanning direction, a scaling factor error in the main-scanning direction, and a registration error in the main-scanning direction. An error in the conveyed distance, for example, caused by a rotation speed error of the conveying roller that conveys the paper sheet or by a worn conveying roller is also known.

To correct such a positional deviation, pattern detecting sensors 117 are provided. Each of the pattern detecting sensors 117 is a photosensor that reads positional deviation correction patterns transferred by the photosensitive drums 109BK, 109M, 109C, 109Y onto the carriage belt 105, and includes a light emitting element for irradiating the correction patterns drawn on the surface of the carriage belt 105 with light, and a light receiving element for receiving the light reflected on the correction patterns.

As illustrated in FIG. 3, the pattern detecting sensors 117 are arranged on the same board along a direction perpendicular to the conveying direction of the carriage belt 105, at a position downstream of the photosensitive drums 109BK, 109M, 109C, 109Y. The pattern detecting sensors 117 according to the embodiment are also used as sensors for reading a correction pattern used in correcting a density variation caused by aging of the apparatus.

The optical writing device 200 according to the embodiment will now be explained. FIG. 4 is a schematic illustrating a positional relationship between the optical writing device 200 according to the embodiment and the photosensitive drums 109. As illustrated in FIG. 4, the light with which the photosensitive drums 109BK, 109M, 109C, 109Y in the respective colors are irradiated is output from respective light emitting diode arrays (LEDAs) 111BK, 111M, 111C, 111Y (hereinafter, any one of the LEDAs is referred to as the "LEDA 111") that are the light sources.

Each of the LEDAs 111 includes light emitting diodes (LEDs) that are light emitting elements arranged along the main-scanning direction of the photosensitive drum 109. A controller in the optical writing device 200 controls on/off status of each of the LEDs arranged along the main-scanning direction in units of each main-scanning line, based on image data that is to be output, so that the surface of the photosensitive drum 109 is selectively exposed and an electrostatic latent image is formed on the photosensitive drum 109.

Controlling blocks of the optical writing device 200 according to the embodiment will now be explained with reference to FIG. 5. FIG. 5 is a schematic illustrating a configuration of functions of the optical writing device 200 according to the embodiment, and connections between the LEDA 111, the pattern detecting sensors 117, and the controller 20. As illustrated in FIG. 5, the optical writing device 200 according to the embodiment includes a pattern storage unit 201, a pixel setting information storage unit 202, a reference value storage unit 203, a detection signal acquiring unit 204, a detection result determining unit 205, and an LEDA writing control circuit 210. The LEDA writing control circuit 210 includes a frequency conversion unit 211, a pattern control unit 212, a skew correcting unit 213, a half-toning control unit 214, and an LEDA control unit 215.

The optical writing device 200 according to the embodiment also includes an information processing mechanism such as a the CPU 10 and storage media, e.g., the RAM 11 and the ROM 12, such as those explained with reference to FIG. 1, and is realized as a combination of hardware and a software controller that is realized by loading the control programs stored in a storage medium such as the ROM 12 onto the RAM 11, and causing the CPU 10 to execute operations following the computer program, in the same manner as in the controller 20 in the image forming apparatus 1.

In the explanation below, a configuration of the optical writing device 200 and functions of the optical writing device 200 performed for the LEDA 111 and the pattern detecting sensors 117 will be explained. As explained earlier with reference to FIGS. 3 and 4, the LEDAs 111 are arranged corresponding to the respective photosensitive drums 109BK, 109M, 109C, 109Y. Therefore, the optical writing device 200 has functions for performing control corresponding to each of phase detecting sensors 118 arranged for the respective LEDAs 111 and each of the photosensitive drums 109 for the respective colors.

The pattern storage unit 201 is one of essential structures according to the embodiment. The pattern storage unit 201 is a storage unit storing therein information allowing the optical writing device 200 to generate a pattern used in a density variation correcting process that is performed to address a variation in the density of an output image caused by aging, and realized as a storage medium such as the ROM 12 or a flash ROM not illustrated. The correction pattern is also used as a dithering pattern when the image processing unit 33 performs dithering based on the result of the correcting process. The correction pattern stored in the pattern storage unit 201 will now be explained with reference to FIGS. 6A and 6B.

FIG. 6A is a schematic of a configuration of a correction pattern generated in the embodiment. As illustrated in FIG. 6A, the correction pattern according to the embodiment is configured as a repetitive arrangement of a dithering pattern. For example, to achieve a square in a size of two centimeters by two centimeters in the resolution of 600 dots per inch, approximately 223,200 dots will be required, based on the calculation 472×472. In the embodiment, a square correction pattern in the size of two centimeters square is formed by arranging 64-dot dithering patterns repetitively in eight columns by eight rows. The pattern storage unit 201 stores therein this 64-dot dithering pattern.

FIG. 6B is a schematic of the dithering pattern arranged in eight columns by eight rows. As illustrated in FIG. 6B, the dithering pattern according to the embodiment has 64 pixels arranged in eight columns by eight rows. An identification (ID) ranging from "psdat00" to "psdat77" is assigned to each of the pixels in a matrix-like manner. Each of the pixels is represented by four bits, as indicated as "3:0" in FIG. 6B. The values of these four bits specify content of the corresponding pixel, that is, are a light emission ID for specifying the light emission status of an LED in the LEDA 111 corresponding to each of the pixels. In this manner, the single dithering pattern illustrated in FIG. 6B is represented by 256 bits in 8×8×4.

Figure 8:
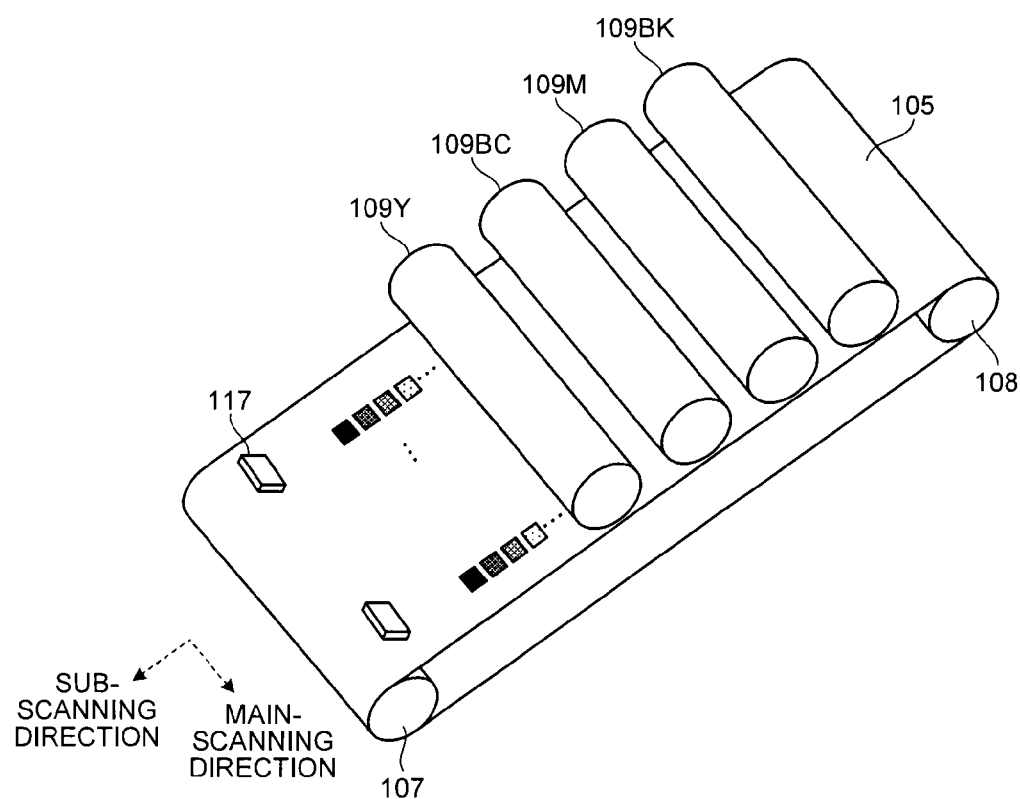
FIG. 8 is a schematic illustrating how correction patterns according to the embodiment are formed.

In the density correcting process according to the embodiment, as illustrated in FIG. 8, eight different patterns, each representing a different density, are formed on the carriage belt 105 based on eight dithering patterns designed for forming correction patterns in different densities. The patterns are then read by the pattern detecting sensors 117, and based on the result of reading, the most appropriate dithering pattern is selected. Therefore, the pattern storage unit 201 stores therein at least eight dithering patterns.

To explain further, as to the arrangement of the eight types of dithering patterns each having a different density, arrangements of pixels, each of which is colored or colorless, not resulting in any image noise, e.g., a vertical streak, a horizontal streak, and a wave, are empirically known. Therefore, in the pattern storage unit 201, dithering patterns not resulting any image noise are stored to achieve the eight different densities. In the embodiment, eight types of patterns each having a different density are formed in each of the colors of CMYK on the carriage belt 105, and the density correcting process is performed for each of these colors.

The pixel setting information storage unit 202 is a storage unit storing therein pixel setting information that is information about pixels each of which corresponds to a four-bit value illustrated in FIG. 6B, and realized as a storage device such as the ROM 12 or a flash ROM not illustrated. The information stored in the pixel setting information storage unit 202 will now be explained with reference to FIG. 7. As illustrated in FIG. 7, the pixel setting information storage unit 202 contains a "light emission ID" represented by the four bits, and information indicating a pixel associated to the corresponding light emission ID.

To perform the correcting process of a density variation caused by aging, the correction patterns needs to be generated in a resolution matching to the resolution of the printing engine 26 included in the image forming apparatus. To match the resolution of the printing engine 26 means to match the resolution of the LEDA 111 included in the printing engine 26. Therefore, the pixel setting information storage unit 202 stores therein pixel information in the resolution corresponding to the resolution of the LEDA 111 mounted on the printing engine 26. In FIG. 7, to simplify the drawing, a single light emission ID is associated with pixel information in different resolutions. However, the information actually stored in the pixel setting information storage unit 202 is pixel information corresponding to the resolution of the LEDA 111 mounted on the printing engine 26.

As explained earlier with reference to FIGS. 6A and 6B, in the embodiment, it is assumed that, for the resolution of 600 dots per inch, 64-pixel dithering patterns arranged in eight columns by eight rows are formed repeatedly, to achieve a correction pattern in the size of two centimeters square. In other words, one pixel in the dithering pattern illustrated in FIG. 6B represents one pixel in the resolution of 600 dots per inch. Therefore, for a resolution of 1200 dots per inch in both vertical and horizontal directions, the resolution is supported by associating a single light emission ID with pixels arranged two columns by two rows.

For a resolution of 1200 by 2400 dots per inch, a single light emission ID is associated with information of pixels arranged in two columns by four rows. For a resolution of 2400 by 2400 dots per inch, a single light emission ID is associated with information of pixels arranged in four columns by four rows. In this manner, a dithering pattern supporting the resolution of the LEDA 111 mounted on different types of printing engines 26 can be achieved, and therefore, a correction pattern supporting each type of the printing engines 26 can be generated.

In the embodiment, even when only two colors, black and white, are available, for example, for a resolution of 600 by 600 dots per inch, pixel information of black or white is associated to each of the 16 four-bit IDs. In this manner, regardless of the resolution of the LEDA 111 mounted, the format used in designing the optical writing device 200 can be unified, and designing workload can be reduced.

As described above, in the density correcting process according to the embodiment, eight different patterns in different densities are formed on the carriage belt 105, based on eight types of dithering patterns designed to achieve correction patterns in different densities. The eight different dithering patterns are realized by selecting a light emission ID specified for each of "psdat00" to "psdat77" in FIG. 6B.

In the density correcting process according to the embodiment, the reference value storage unit 203 is a storage unit storing therein reference density data that is to be compared with a result of reading performed by the pattern detecting sensor 117, and realized as a storage device such as the ROM 12 or a flash ROM not illustrated. The information of the density detected by the pattern detecting sensor 117 is represented as a voltage of the detection signal, for example. In such a case, the reference value storage unit 203 stores therein information of a voltage corresponding to a reference density.

The detection signal acquiring unit 204 acquires digital data of the detection signals received from the pattern detecting sensors 117. In other words, the detection signal acquiring unit 204 is a reading signal acquiring unit that acquires a correction pattern reading signal. Because the pattern detecting sensor 117 irradiates the correction patterns formed on the carriage belt 105 with light, and outputs an electric signal corresponding to the intensity of the reflection, the detection signal output from the pattern detecting sensor 117 is an analog signal. The detection signal acquiring unit 204 performs processes such as amplification, filtering, and an analog-to-digital (A/D) conversion to the analog signal, to obtain a detection signal from the pattern detecting sensor 117 in the form of digital data, with reference to a given sampling frequency. To realize these functions, the detection signal acquiring unit 204 is realized as hardware such as an amplifier, a filter, and an A/D converter, and a software controller that samples the data and stores the data in a storage medium.

The detection result determining unit 205 is a dithering pattern selecting unit that compares a detection result acquired by the detection signal acquiring unit 204 with the reference density data stored in the reference value storage unit 203, and selects a dithering pattern corresponding to a density that is closest to the reference density data stored in the reference value storage unit 203, from the results of detecting the eight patterns. The detection result determining unit 205 obtains the dithering pattern thus selected from the pattern storage unit 201, obtains the pixel information stored in the pixel setting information storage unit 202, and outputs the pixel information to the controller 20. In this manner, the dithering pattern is updated, so that the controller 20 can use the updated pattern in performing the next image formation output. In this manner, the density correcting process for addressing aging is completed. The detection result determining unit 205 is realized as a software controller that is realized by causing the CPU 10 to perform operations following software programs loaded onto the RAM 11.

The LEDA writing control circuit 210 is a light emission control unit that controls light output from the LEDA 111 based on drawing information received from the controller 20, and is realized as hardware such as an integrated circuit. The frequency conversion unit 211 outputs the drawing information received from the controller 20 in association with the operating frequency of the LEDA writing control circuit 210. The pattern control unit 212 controls generation of the correction pattern explained so far. To generate the correction pattern, the pattern control unit 212 obtains the dithering pattern stored in the pattern storage unit 201, and outputs the pixel information configured as a repetitive arrangement of the same dithering pattern as drawing information, as explained with reference to FIG. 6A.

When a usual image formation output operation controlled by the controller 20 is performed, the drawing information received from the frequency conversion unit 211 is input to the skew correcting unit 213, without applying any process in the pattern control unit 212. The skew correcting unit 213 corrects an image skew caused by various factors, such as an arrangement error of the LEDA 111 and the photosensitive drum 109. Parameters related to the skew correction are stored in a storage device included in the optical writing device 200, and input to the skew correcting unit 213 under the control of the CPU 10 included in the optical writing device 200. The skew correcting unit 213 performs the skew correction based on the parameters thus input.

The half-toning control unit 214 converts drawing information having multiple tone levels and received from the skew correcting unit 213 into information in two tones of a color, that is, with a color or without color, to generate pixel information ultimately used in controlling light output from the LEAD 111. In the density variation correcting process, the half-toning control unit 214 according to the embodiment also obtains the pixel setting information stored in the pixel setting information storage unit 202 based on the light emission ID specified in the dithering pattern, as illustrated in FIG. 6B, and generates pixel information ultimately used in controlling the light output from the LEDA 111. The LEDA control unit 215 controls the light output from the LEDA 111 at the operating frequency, based on the pixel information received from the half-toning control unit 214.

In this manner, in the optical writing device 200 according to the embodiment, a dithering pattern is generated as illustrated in FIGS. 6A and 6B, using the resolution of 600 dots per inch that is relatively a low resolution among possible resolutions of the LEDA 111 as a reference, and stored in the pattern storage unit 201. The IDs are specified in the dithering pattern, as if in a lookup table, without directly specifying the tone value of each pixel, and the information of a pixel associated with the corresponding ID is stored in the pixel setting information storage unit 202 in the resolution of the LEDA 111 mounted.

As described above, for the resolution of 600 dots per inch, a storage capacity of a single pattern consisting of pixels each of which is represented by four bits and that are arranged in eight columns by eight rows is 256 bits (32 bytes). When the resolution is 1200 dots per inch, the amount of information required to represent a pattern of the same size would be quadrupled. When the resolution is 2400 dots per inch, the amount of information required to represent a pattern in the same size would be 16 times lager. In this manner, as the resolution increases, the required capacity will increase dramatically. As a result, the capacity of a memory to be mounted on the optical writing device 200 needs to be increased.

In response to this issue, the dithering pattern itself is designed for 600 dots per inch, and for the patterns in higher resolutions, e.g., 1200 dots per inch or 2400 dots per inch, the pixel information, which can be specified by a single light emission ID, is associated with the higher resolutions, as illustrated in FIG. 7. Therefore, even if the dithering pattern itself is designed for 600 dots per inch, correction patterns for higher resolutions can be generated ultimately. In this manner, a highly precise density correction can be realized.

In other words, in the embodiment, the dithering pattern illustrated in FIG. 6B is designed for a resolution lower than the resolution of the LEDA 111, and one of the two available tones of a color is specified for a plurality of pixels in the pixel setting information illustrated in FIG. 7 based on a ratio between the resolution of the dithering pattern and the resolution of the LEDA 111. In this manner, the information capacity of the dithering pattern is reduced, so that the memory capacity to be mounted on the optical writing device 200, and processing load and the circuit scale of the pattern control unit 212 can be reduced.

As indicated in "1200×1200 dpi" to "2400×2400 dpi" in FIG. 7, when information indicating one of the two available tones for a plurality of pixels is associated with a single light emission ID, the amount of required information increases, compared with when only black or white is associated with the light emission ID, as in "600×600 dpi". However, the pixel information that needs to be stored is only for the 16 light emission IDs each specified by four bits. Therefore, the capacity increase will not be as dramatic as when the dithering pattern itself is modified to support higher resolutions, and the storage capacity to be implemented on the optical writing device 200 can be reduced.

In addition, the optical writing device 200 according to the embodiment performs the density adjustment operation with the dithering pattern independently, without obtaining drawing information from the controller 20. Therefore, the interoperability with the controller 20 does not need to be considered for the density adjustment operation, and workloads in designing the controller 20 and the optical writing device 200 can be reduced.

Furthermore, in performing the density adjustment operation using the dithering pattern according to the embodiment, image processing performed by the controller 20 is not required. Therefore, the LEDA writing control circuit 210 does not need to wait for processing of the controller 20 while performing the density adjustment operation. Therefore, the time required for the density adjustment operation can be reduced. Because processing loads can be distributed among the controller 20 and the LEDA writing control circuit 210, the efficiency of the operation of the image forming apparatus 1 can be improved.

In a printer in which the image processing performance depends on PCs, there is an inefficiency caused by a mismatch between the performance of the image processing function and the performance of the printer. For example, dithering might be applied with an excessive dithering pattern in a resolution higher than that of the LEDA 111 mounted on the printer, or using a dithering pattern in a resolution lower than that of the LEDA 111. To address this issue, in the optical writing device 200 according to the embodiment, the dithering pattern determined by the detection result determining unit 205 is output to the controller 20, and the controller 20 performs the dithering using the dithering pattern thus determined. In other words, because the image processing is performed using the dithering pattern determined in the printing engine 26, the dithering will be performed in a manner completely suitable for the printing engine 26. In this manner, the controller 20 enables inefficiencies of the apparatus operation, such as performing unnecessary processing or inability of fully utilizing the performance of LEDA 111, to be avoided.

As described above, the optical writing device 200 has a function for controlling each of the LEDAs 111 and each of the photosensitive drums 109 for each of the colors. This function is realized by providing the LEDA writing control circuit 210 corresponding to each of the LEDAs 111 for each of the colors. In a configuration in which the controller 20 controls the density variation correcting process with the dithering pattern, the controller 20 performs the process with the dithering pattern for all of the LEDAs 111 for the respective colors. By contrast, in the embodiment, because the LEDA writing control circuits 210 corresponding to the respective colors execute the process, the process can be distributed, and the apparatus can be controlled efficiently.

Figure 9:
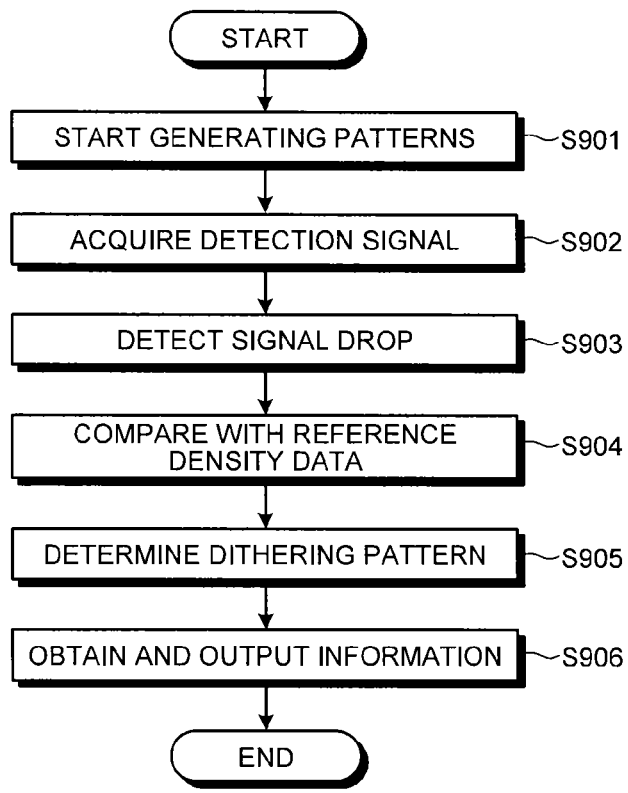
FIG. 9 is a flowchart illustrating a density correcting operation performed with the dithering pattern according to the embodiment.

The density adjustment operation performed with the dithering pattern according to the embodiment will now be explained with reference to FIG. 9. FIG. 9 is a flowchart illustrating the density adjustment operation performed using the dithering pattern according to the embodiment. As illustrated in FIG. 9, when the density adjustment operation with the dithering pattern is started at given timing, the LEDA writing control circuit 210 starts generating a pattern (S901).

The timing at which the LEDA writing control circuit 210 starts the density adjustment operation with the dithering pattern is determined by the CPU 10 included in the optical writing device 200 performing an operation following a computer program loaded onto the RAM 11. Specifically, the timing is, for example, time of power-on reset (PoR) of the image forming apparatus 1, time of resuming from an energy saving mode, or time of initialization performed before executing an image forming output under the control of the controller 20. Alternatively, the optical writing device 200 may execute the density adjustment operation with the dithering pattern according to the embodiment during the process of correcting the positional deviation explained above.

Upon starting the pattern generation, the LEAD writing control circuit 210 obtains the eight dithering patterns from the pattern storage unit 201, and obtains the pixel information corresponding to the respective light emission ID from the pixel setting information storage unit 202. The LEDA writing control circuit 210 then controls the light output from the LEDA 111 so that the eight different correction patterns are formed in different densities, as explained with reference to FIG. 8.

Once the correction patterns are formed on the carriage belt 105 at S901, the pattern detecting sensor 117 outputs a detecting signal for the correction patterns formed on the carriage belt 105, and the detection signal acquiring unit 204 acquires the detection signals (S902). The detection signal acquiring unit 204 generates digital data of the detection signal received from the detection signal, which are analog data as explained earlier, and stores the digital data thus generated from the detection signal in a storage medium such as the RAM 11.

Figure 10:
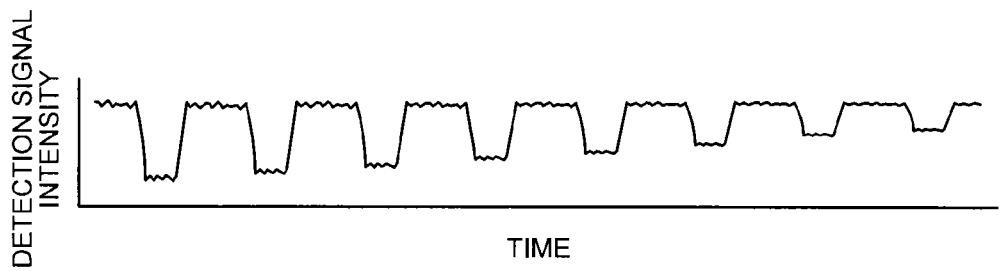
FIG. 10 is a schematic of an example of a reading signal of the correction patterns according to the embodiment.

Explained now with reference to FIG. 10 is how the digital data (hereinafter, referred to as detected density data) is acquired for the detection signal by the detection signal acquiring unit 204. FIG. 10 is a schematic of the detected density data acquired over time by the detection signal acquiring unit 204. As explained earlier, the correction pattern according to the embodiment is formed as eight different patterns each having a different density. Therefore, as the detected density data, the detected density data is obtained for the eight different patterns, sequentially over time.

In the embodiment, the highest intensity, that is, the highest voltage can be obtained for the detection signal for an area in a solid color, that is, white. As the density increases, the signal intensity decreases. Therefore, as illustrated in FIG. 10, in the detected density data plotted over time, the signal intensity drops eight times. A drop in the signal intensity represents a detected signal intensity for a certain density. In the example illustrated in FIG. 10, the leading edge of the correction pattern has the highest density, and the density is gradually reduced toward the trailing edge.

The detection signal acquiring unit 204 analyses the detected density data acquired over time as illustrated in FIG. 10, identifies a drop in the detection signal, and acquires the signal intensity at the drop as the detected density (S903). The level of the detection signal is not always constant during a single drop, and might include a minor variation resulting from a detection error, as illustrated in FIG. 10. Therefore, the detection signal acquiring unit 204 obtains an average or a median for each of these drops, to obtain a single piece of detected density data for each of the drops. The detection signal acquiring unit 204 then establishes an association between the order in which each of these drops occurred and each piece of detected density data thus acquired, and stores the information in a recording medium such as the RAM 11.

Once the detection signal acquiring unit 204 detects the drops in the signal intensity, and obtains and stores the detected density data for the eight correction patterns, the detection result determining unit 205 compares each piece of detected density data stored in the recording medium with the reference density data stored in the reference value storage unit 203, and obtains the difference between each piece of the detected density data and the reference density data (S904).

Once the difference with respect to the reference density data is obtained for each of the eight pieces of the detected density data, the detection result determining unit 205 selects the most appropriate dithering pattern based on the detected density data having the smallest difference, among the pieces of detected density data generated from the eight drops in the detected signal illustrated in FIG. 10 (S905).

Stored in the detection result determining unit 205 in advance is information indicating the order in which the eight different dithering patterns stored in the pattern storage unit 201 are used when the correction pattern is formed. The detection result determining unit 205 then determines the most appropriate dithering pattern based on the order at which the drop resulting in the detected density data with the smallest difference has occurred in the detection signal over time. In other words, at step S905, the detection result determining unit 205 selects a dithering pattern used in a correction pattern resulting in a detected density nearest to the reference density data, from the eight different correction patterns.

Once the most appropriate dithering pattern is determined at step S905, the detection result determining unit 205 obtains the information of the most appropriate dithering pattern from the pattern storage unit 201, and obtains the information illustrated in FIG. 7 in which the light emission ID and the pixel information are associated, and output the information to the controller 20 (S906). In this manner, the image processing unit 33 included in the controller 20 can perform dithering using a dithering pattern that is suitable for a density variation caused by aging of the printing engine 26, and can adjust the density of an image formed in an image formation output.

As described above, in the optical writing device 200 according to the embodiment and the image forming apparatus 1 including the optical writing device 200, density can be corrected highly precisely with dithering, without increasing the complexities in the structures of the image processing unit and the engine unit.

In the example explained in the embodiment, the detection signal acquiring unit 204 is explained to determine the detection signal detected from a correction pattern based on a drop in the signal intensity. However, the present invention is not limited thereto, and the detection signal acquiring unit 204 may also acquire the detection signal based on timing at which the correction pattern arrives at the detecting position of the pattern detecting sensor 117.

For example, the detection signal acquiring unit 204 may be pre-stored with information indicating a period from when the LEDA control unit 215 starts controlling the light output from the LEDA 111 and the correction pattern is started being formed, to when the correction pattern arrives at the detecting position of the pattern detecting sensor 117. In this manner, the detection signal for the correction pattern can be acquired, by determining the timing at which the detection signal is to be acquired based on a value of a counter started when the LEDA control unit 215 starts controlling the output of the LEDA 111 and the correction pattern is started being formed. In this manner, the detection signal acquiring unit 204 can operate in the same manner.

According to the embodiment, highly precise density correction can be performed through dithering without increasing the complexity of structures of an image processing unit and an engine unit included in an image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device comprising:
    a pattern storage unit configured to store therein pieces of dithering information indicating a plurality of dithering patterns whose densities are different, each dithering pattern being made up of a given number of pixels, each piece of dithering information including pieces of identification information associated with the pixels of the corresponding dithering pattern, respectively;
    a pixel setting information storage unit configured to store therein pieces of pixel setting information in which pieces of colored/colorless information indicating each of the pixels is colored or colorless are associated with the pieces of identification information, respectively, the pieces of colored/colorless information being set based on a resolution of a light source for forming an electrostatic latent image on a photosensitive element;
    a light emission control unit configured to causes the light source to emit light based on pixel information;
    a reading signal acquiring unit configured to acquire a reading signal resulting from optically reading an image formed by developing the electrostatic latent image formed on the photosensitive element and conveyed; and
    a dithering pattern selecting unit configured to select and output one of the pieces of dithering information based on the reading signal, wherein
    in an operation of selecting the dithering pattern, the light emission control unit arranges the same dithering patterns in a way that the dithering patterns form a pattern with a given size, for each of the different dithering patterns stored, and cause the light source to emit light based on pixel information generated by setting the pixels of each of the same dithering patterns to be colored or colorless in accordance with the pixel setting information, to form electrostatic latent images of a plurality of patterns each in the given size and in a different density,
    the reading signal acquiring unit acquires a reading signal corresponding to the density for each of the patterns in the given size and different densities, and
    the dithering pattern selecting unit selects and outputs one of the pieces of dithering information corresponding to a reading signal that indicates a density closest to a predetermined reference density among the reading signals acquired from the patterns in the given size and the different densities.

2. The optical writing device according to claim 1, wherein
    the pieces of dithering information each indicate indicating a dithering pattern corresponding to a resolution that is lower than the resolution of the light source, and
    the pieces of colored/colorless information are set based on a ratio between the resolution of the dithering pattern and the resolution of the light source.

3. The optical writing device according to claim 1, wherein
    the light emission control unit forms the electrostatic latent images of the patterns in the given size and the different densities in a sequence, and
    the reading signal acquiring unit acquires a time-series output signal from a sensor that outputs a lower intensity signal upon reading a subject with a higher density, and acquires drops in the time-series signal thus acquired as reading signals corresponding to the patterns in the given size and the different densities, respectively.

4. An image forming apparatus comprising:
    an image processing unit configured to perform image processing based on a print job; and
    the optical writing device according to claim 1, wherein
    the image processing unit performs image processing using the one of the pieces of dithering information output from the optical writing device.

5. An optical writing method performed in an optical writing device that includes a pattern storage unit configured to store therein pieces of dithering information indicating a plurality of dithering patterns whose densities are different, each dithering pattern being made up of a given number of pixels, each piece of dithering information including pieces of identification information associated with the pixels of the corresponding dithering pattern, respectively, and a pixel setting information storage unit configured to store therein pieces of pixel setting information in which pieces of colored/colorless information indicating each of the pixels is colored or colorless are associated with the pieces of identification information, respectively, the pieces of colored/colorless information being set based on a resolution of a light source for forming an electrostatic latent image on a photosensitive element, the optical writing method comprising:
    arranging the same dithering patterns in a way that the dithering patterns form a pattern with a given size, for each of the different dithering patterns stored;
    causing the light source to emit light based on pixel information generated by setting the pixels of each of the same dithering patterns to be colored or colorless in accordance with the pixel setting information, to form electrostatic latent images of a plurality of patterns each in the given size and in a different density;
    acquiring a reading signal corresponding to the density for each of the patterns in the given size and different densities; and
    selecting and outputting one of the pieces of dithering information corresponding to a reading signal that indicates a density closest to a predetermined reference density among the reading signals acquired from the patterns in the given size and the different densities.

6. A non-transitory computer-readable recording medium with an executable program stored thereon for controlling an optical writing device that includes a pattern storage unit configured to store therein pieces of dithering information indicating a plurality of dithering patterns whose densities are different, each dithering pattern being made up of a given number of pixels, each piece of dithering information including pieces of identification information associated with the pixels of the corresponding dithering pattern, respectively, and a pixel setting information storage unit configured to store therein pieces of pixel setting information in which pieces of colored/colorless information indicating each of the pixels is colored or colorless are associated with the pieces of identification information, respectively, the pieces of colored/colorless information being set based on a resolution of a light source for forming an electrostatic latent image on a photosensitive element, wherein the program instructs a processor of the optical writing device to perform:

arranging the same dithering patterns in a way that the dithering patterns form a pattern with a given size, for each of the different dithering patterns stored;

causing the light source to emit light based on pixel information generated by setting the pixels of each of the same dithering patterns to be colored or colorless in accordance with the pixel setting information, to form electrostatic latent images of a plurality of patterns each in the given size and in a different density;

acquiring a reading signal corresponding to the density for each of the patterns in the given size and different densities; and selecting and outputting one of the pieces of dithering information corresponding to a reading signal that indicates a density closest to a predetermined reference density among the reading signals acquired from the patterns in the given size and the different densities.

* * * * *